United States Patent

[15] 3,648,947

Shelton

[45] Mar. 14, 1972

[54] WELDING WIRE FEEDING MECHANISM

[72] Inventor: R. Leon Shelton, 11645 Kosine Lane, Loveland, Ohio 45140

[22] Filed: July 31, 1970

[21] Appl. No.: 60,072

[52] U.S. Cl..........................................................242/128
[51] Int. Cl.......................................................B65h 49/00
[58] Field of Search....................242/128, 129, 129.5–129.8

[56] References Cited

FOREIGN PATENTS OR APPLICATIONS 836,528  6/1960  Great Britain..........................242/128
695,615  12/1930  France....................................242/128

*Primary Examiner*—Leonard D. Christian
*Attorney*—Robert A. Spray

[57] ABSTRACT

Mechanism for feeding welding wire, as from a supply coil, having for the unwinding welding wire a rotatable first feed-guide for guiding the wire around the end of the supply coil, and a second feed-guide carried axially of the axis of rotation of the first feed-guide.

8 Claims, 2 Drawing Figures

PATENTED MAR 14 1972

3,648,947

R. LEON SHELTON,
INVENTOR.

BY Robert A. Spray

ATTORNEY

WELDING WIRE FEEDING MECHANISM

The mechanism concepts of the present invention provide a novel feeding mechanism which feeds flexible welding wire from a wound wire supply means in an orderly manner which minimizes any tendency of the welding wire to tangle or kink.

More particularly, the concepts provide a wire-feeding device or mechanism which will operatively straighten out minor kinks and block wire-travel if there happen to be relatively major kinks in said wire, and which, if there are no kinks in the welding wire prior to its entering the mechanism, will assure effective wire-feeding to associated wire-utilizing apparatus in smooth and straight continuity, that is, in a manner in which successive portions of the welding wire come from the mechanism in co-linear manner.

The novel concepts of the invention provide a supported pair of wire feed-guides, a first one being non-axially carried with respect to its axis of rotation, and a second feed-guide being located axially with respect to said axis although farther from the supply coil or reel.

Moreover, the invention concepts provide that the support of the second feed-guide is itself rotatable in coordination to that of the first feed-guide; and this provides that the support continually and automatically remains clear of interference with the wire being fed through the mechanism, even though in its feeding it sweeps through a zone which is circumferentially continuous.

Figure 1:
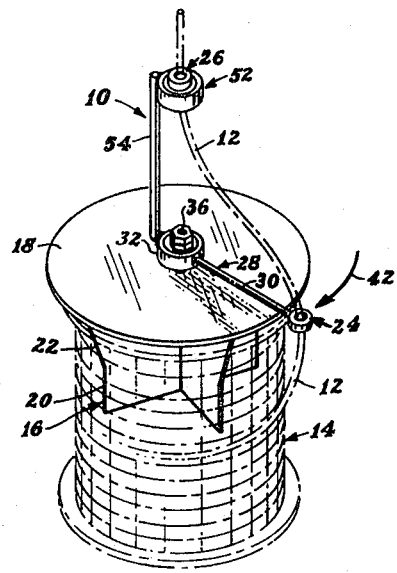
Figure 2:
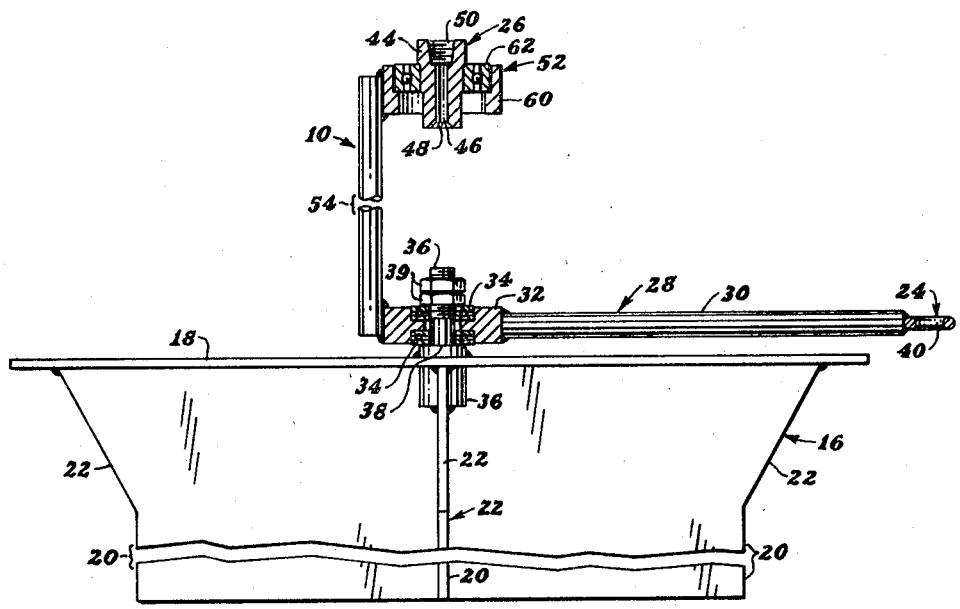

The above description is quite introductory and of a generalized nature; in the above and further concepts, and other details and features of the invention will be further apparent in the following description of an illustrative embodiment of the invention, taken in conjunction with the accompanying somewhat diagrammatic and schematic drawings, and in which:

FIG. 1 is a pictorial view of a welding wire feeding mechanism, illustrative of the inventive concepts, the mechanism being shown as mounted on an associated welding wire supply coil or reel; and FIG. 2 is an elevational view of the welding wire feeding mechanism shown in FIG. 1, portions thereof being shown in section to illustrate interior details, and portions being shown as broken away to reduce the overall size of the drawing on the sheet.

As shown in the drawings, a welding wire feeding mechanism 10 which is illustrative of the inventive concepts is shown as feeding welding wire 12 from an associated wire supply means such as the coil or reel 14 shown.

Support for the device 10 is shown by a support 16; and the support 16 is shown as having a generally flat and circular disk or plate 18 having welded thereto a plurality of vertically extending plates 20, the upper portions of which are provided with an upwardly and outwardly directed taper 22. As is indicated in FIG. 1, the arrangement of the vertical supporting plates 20 is such that in use of the feeding device 10 on an associated wire reel 14, the plates 20 extend downwardly into the open hollow core of the supply coil 14, the taper 22 accommodating a stability of support by reels having a range of core diameters.

The plates 20 provide a convenient mounting means, supporting the device 10 in a centralized location with respect to the reel 14 such that the rotation of wire-feed details described below is generally coaxial with the feed of wire 12 from the reel 14.

As hereinafter set forth in greater detail, the controlled feed of the welding wire 12 is by a first feed-guide 24 and a second feed-guide 26; and it is the relationship and carry of these two feed-guides 24 and 26, and their co-operative function in the overall combination, which achieve the desired and advantageous wire-guiding operativity of the present invention.

(It will be understood that the wire 12, as it is fed outwardly (upwardly in FIG. 1) of the mechanism 10, is fed to an associated apparatus (not shown) which utilizes the delivery thereto of the welding wire 12.)

The first feed-guide 24 is shown as carried by a wire-guiding means 28, shown here as an arm-like member 30 shown as welded to a central body member 32. The body member 32 is shown as having ball thrust bearings 34 which are shown as received on an upright shaft 36 which has an upwardly facing abutment shoulder 38 providing vertical support for the lower of the bearings 34; and the supporting shaft 36 is shown as welded to the supporting base 18. Nuts 39 maintain the arm assembly 28 in place on the shaft 36, the upper portion of the shaft 36 being suitably threaded.

The bearings 34 provide that the said first wire-guiding arm assembly 28 is rotably supported with respect to the support 20 and is rotatably movable with respect thereto. The arm 30 carries the first feed-guide 24 for rotational movement which is relatively adjacent the associated wire supply means 14, but at a distance from the axis of rotation (shaft 36) of the wire-guiding means 28, which is also of course the axis of rotation of the arm 30 in the device 10 as shown.

The first feed-guide 24 provides a localized guiding of the welding wire 12. That is, it is of a general ring-shape which provides a relatively small feed-guide opening 40 through which the welding wire 12 is threaded.

A reference arrow 42 (FIG. 1) illustrates the rotational movement of the first feed-guide 24; and, the bearings 34 provide a support of the first wire-guiding means 28 which is sufficiently friction-free such that the first feed-guide 24 with its wire opening 40 is free to move circumferentially about the axis of support provided by the shaft 36, as the wire 12 unwraps from the reel 14 during the wire-feeding actuation of the device, thus guiding the wire over the end of the reel 14.

The second wire-guiding means 26 is shown as a rather short nipple 44, and as will be further explained below, the bore 46 of the nipple 44 is generally coaxial and co-linear with the axis provided by the aforesaid shaft 36. The lower end 48 of the nipple 44 (being the end thereof which is toward the wire supply reel 14) is shown as flared to provide a smooth entrance of the welding wire 12 into the bore 46 of the nipple 44; and the other end 50 of the nipple 44 is shown as provided with threads, providing convenient means for the securing thereto of a section of delivery pipe or the like (not shown) which can, if desired, supportingly guide the welding wire 12 further to the associated wire-utilizing apparatus.

As is shown in the drawings, and as will be further explained, the said second wire-guiding feed-guide 26 is carried at a location which is relatively toward the said associated wire-utilizing apparatus, in contrast to the location of the said first feed-guide 24 in reference to the location of the supply reel 14.

The second feed-guide 26 is shown as supported by a second wire-guiding means 52 which is shown as supported by a support member 54 extending upwardly from the said first wire-guiding means 28, the arm 54 being shown as welded to the body member 32.

The support 54, it will be particularly noted, is located remote from the first feed-guide 24, that is, having reference to both that feed-guide 24 and to the region of the wire-path between the first feed-guide 24 and the second feed-guide 26. This provides that the rotation of the first wire-guiding means 28, and its arm 30 and first feed-guide 24, as the welding wire 12 is being fed from successive circumferential sectors of the associated wire-supply reel 14, automatically and correspondingly achieves a rotation of the support bar or post 54 about the axis of the shaft 36, which as stated above, is of course the axis of rotation of the first wire-guiding means 28 and its arm 30 and first feed-guide 24.

This automatic and corresponding rotation of the support bar 54 thus continually and automatically moves and keeps that support bar 54 clear of undesired interference with the welding wire 12 which is moving from the first feed-guide 24 to the second feed-guide 26, even though the welding wire 12 in that movement sweeps fully around the axis of rotation (shaft 36) of the first wire-guiding means 28 in a manner which may be described as generally the generation of an imaginary circumferentially continuous shape through whose imaginary surface the support bar 54 extends. (That imaginary surface may be, with obviously some over-simplification, be described as generally that of a cone.)

It will be noted that the support member 54 is located non-coaxially with respect to the second wire-guiding feed-guide 26; and the supporting connection of member 54 and that feed-guide 26 is by the second wire-guiding means 52 which is shown as including a supporting collar or disk 60 shown welded to the top end of the support bar 54, and a radial bearing 62 mounted in and supported by the collar 60.

The collar 60 and the bearing 62 are concentrically coaxial with the second feed-guide 26; and as shown the nipple 44 is received or mounted in the hollow core of the bearing 62. Thus it will be seen that the nipple 44 is rotatable relative to the supporting collar 60 and the supporting bar 54.

An advantage of the inventive concepts is that at least one of the feed-guide 24 or 26 is of a restricted-area nature, and this is operative to straighten out relatively minor kinks of the welding wire 12; and the restricted-area nature is such as to block the travel of the wire 12 having any relatively major kinks in the wire, which kinks would be undesired in the apparatus (not shown) which utilizes the welding wire 12 as supplied from this device 10.

An overall advantage of the present invention is that the device 10 provides, by the advantageous combination of the two feed-guides 24 and 26, a means for not only withdrawing or feeding the welding wire 12 from the associated reel 14 in an orderly manner, but that even though the first feed-guides moves in a circle having a relatively great radius (to assure that the wire 12 fully clears the end of the reel 14) the wire 12 is delivered from the second feed-guide in an orderly manner in which successive portions of the wire 12 come from the mechanism 10 in co-linear manner, which provides efficient and effective utilization of the wire 12 by the associated apparatus which utilizes the welding wire delivered by this device 10.

It is thus seen that a welding wire feeding mechanism according to the present invention provides a device that has novel and advantageous concepts, the details of which are as set forth herein or inherent in the construction disclosed. The present invention thus accomplishes its intended objects, including those hereinbefore pointed out and others which are inherent in the invention.

It will be understood that modifications and variations may be effected without departing from the scope of the novel concepts of the present invention. Accordingly, the invention is not to be considered limited to the specific form or arrangement herein described and shown.

What is claimed is:

1. Welding wire feeding mechanism feeding flexible welding wire from an associated wire supply means to associated apparatus which utilizes the delivery thereto of said welding wire, comprising:

support means adapted to be relatively fixedly supported by said associated wire supply means;

a first wire-guiding means rotatably supported by said support means and rotationally movable with respect thereto, and having a first wire-guiding localized feed-guide carried for movement relatively adjacent said associated wire supply means but at a distance from the axis of rotation of said wire-guiding means; and a second wire-guiding means operatively supported by said support means, and having a second wire-guiding localized feed-guide at a location relatively toward said associated wire-utilizing apparatus, in contrast to the location of said first feed-guide in reference to the said associated supply means, but generally co-axial with the axis of rotation of said first wire-guiding means and of its said first feed guide;

the said first and second wire-guiding feed-guides cooperating, when the associated welding wire is operatively threaded through both said feed-guides, to minimize undue lashing and whipping of welding wire coming from said associated supply means;

in a combination in which the support of said second wire-guiding means includes a support member located non-coaxially with respect to the said second wire-guiding feed-guide of said second wire-guiding means, and the support of said second wire-guiding feed-guide includes a guide-support generally concentrically coaxial therewith;

characterized by there being provided supportingly interconnecting means which include a radial bearing means, which operatively supportingly interconnect said guide-support and said second feed-guide but permit relative rotation thereof.

2. The invention as set forth in claim 1 in a combination in which the said support means is adapted to be supported at a location with respect to said associated wire supply means such that the axis of rotation of the said first wire-guiding means and of its said first feed guide is generally co-axial with the feed of wire from said associated wire supply means.

3. The invention as set forth in claim 1 in a combination in which the said second wire-guiding means is carried by the said first wire-guiding means, being operatively connected thereto and supported thereby.

4. The invention as set forth in claim 1 in a combination in which the means which operatively support said second wire-guiding means is located remote from the said first wire-guiding feed-guide of the said first wire-guiding means, having reference to both the said first feed-guide and to the region of the wire-path between the said first feed-guide and the said second feed-guide, thereby providing:

that the rotation of the said first wire-guiding means, which corresponds to the rotation of its said first feed-guide as the welding wire is being fed from successive circumferential sectors of its associated supply means, automatically and correspondingly achieves a rotation, of the said means which operatively support said second wire-guiding means, which last-mentioned rotation continually and automatically moves and keeps said operatively supporting means clear of undesired interference with the welding wire moving from said first feed-guide to said second feed-guide, even though said welding wire in its said moving sweeps fully around the axis of rotation of the said first wire-guiding means in a manner which is generally the generation of an imaginary circumferentially continuous shape through whose imaginary surface the said operatively supporting means extends.

5. The invention as set forth in claim 4 in a combination in which the location of at least the portion, of the said operatively supporting means which is operatively adjacent the said second feed-guide of said second wire-guiding means, is generally diametrically opposite the said first wire-guiding feed-guide of said first wire-guiding means, having reference to the axis of rotation of said first wire-guiding means as viewed from a location in which said axis appears in point view.

6. The invention as set forth in claim 1 in a combination in which the said support means includes a thrust bearing means in its support of said first wire-guiding feed-guide of said first wire-guiding means.

7. The invention as set forth in claim 1 in a combination in which the feed-guide of at least one of said first wire-guiding feed-guide and said second wire-guiding feed-guide is of a restricted-area nature operative to operatively straighten out relatively minor kinks of said wire, and to block travel therepast of relatively major kinks of said wire.

8. The invention as set forth in claim 1 in a combination in which the said second wire-guiding feed-guide is operative to deliver wire toward said associated wire-utilizing apparatus in an orderly manner in which successive portions of said wire come from said mechanism in co-linear manner.

* * * * *